C. G. BUTTKEREIT. Improvement in Rafter-Hook.
No. 128,281. Patented June 25, 1872.
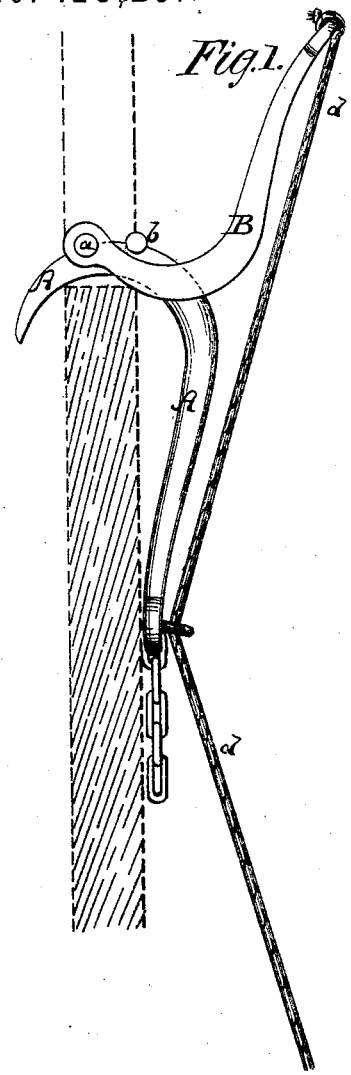
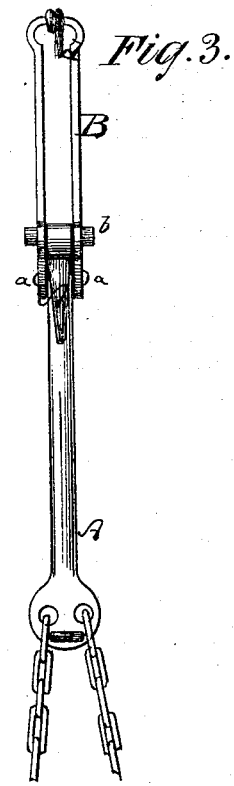
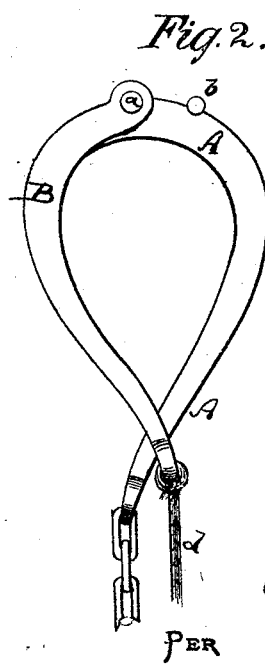
Witnesses:
John Becker.
W. A. Graham
Inventor:
C. G. Buttkereit
PER Munn & Co
Attorneys.
AM. PHOTO-LITHOGRAPHIC CO. N.Y. (OSBORNE'S PROCESS.)

UNITED STATES PATENT OFFICE.

CARL GUSTAV BUTTKEREIT, OF TOLEDO, IOWA.

IMPROVEMENT IN RAFTER-HOOKS.

Specification forming part of Letters Patent No. 128,281, dated June 25, 1872.

Specification describing a new and Improved Rafter-Hook, invented by CARL GUSTAV BUTTKEREIT, of Toledo, in the county of Tama and State of Iowa.

Figure 1 represents a side view of my improved rafter-hook, showing it applied. Fig. 2 is a side view of the same, showing it detached; and Fig. 3 is an edge view of the same.

Similar letters of reference indicate corresponding parts.

This invention relates to a new hook for use in connection with fire-escapes, hay-elevators, and conveyers of suitable kind, with the object of furnishing a secure support, and permitting the instantaneous detachment of the same from the sill, rafter, or beam on which it hangs. The invention consists in providing the hook with a pivoted detaching-lever and with a stop for the same, as hereinafter more fully described.

A in the drawing represents the hook, of suitable size and material. To it is pivoted, at $a$, a lever, B, which is turned up, as in Fig. 1, when the hook is applied over a window-sill or other support. In this position the lever butts against a stop, $b$, that projects from the hook.

I prefer to make the lever B slotted, as shown in Fig. 3, though it may be applied singly to one side of the lever.

Whenever the hook is to be detached from its support a string, $d$, which connects with the end of the lever B, is pulled, causing the lever to roll, with its rounded inner part on the support, gradually clearing the same of the hook, and finally forming a loop with the hook, in manner clearly shown in Fig. 2.

A fire-escape or other device can be suspended from the hook; or the same may also be used for other purposes, as a trace-fastener for harness, allowing instantaneous detachment if the horses become unruly; and on other places.

Having thus described my invention, I claim as new and desire to secure by Letters Patent—

The combination of the hook A with the pivoted lever B and stop $b$, as set forth.

CARL G. BUTTKEREIT.

Witnesses:
C. C. WHITTEN,
WM. RIECKHOFF.